United States Patent [19]

Handl et al.

[11] Patent Number: 4,485,520
[45] Date of Patent: Dec. 4, 1984

[54] FOAMED RUBBER ERASERS AND PROCESS FOR THE PRODUCTION THEREOF

[75] Inventors: Werner Handl, Altdorf; Rupert Englbrecht, Burghausen, both of Fed. Rep. of Germany

[73] Assignee: Firma J. S. Staedtler, Fed. Rep. of Germany

[21] Appl. No.: 203,359

[22] Filed: Nov. 3, 1980

[30] Foreign Application Priority Data

Nov. 3, 1979 [DE] Fed. Rep. of Germany ....... 2944503

[51] Int. Cl.³ .................. B43L 19/00; B29D 27/00; C08J 9/30
[52] U.S. Cl. ........................................ 15/424; 264/26; 264/50; 264/DIG. 60; 425/4 R; 425/4 C; 521/74
[58] Field of Search ............... 264/26, 50, DIG. 60; 15/424; 521/74; 425/4 R

[56] References Cited

U.S. PATENT DOCUMENTS

| | | | |
|---|---|---|---|
| 2,666,036 | 1/1954 | Schwencke | 264/DIG. 60 |
| 2,693,006 | 11/1954 | Shigekawa | 264/50 X |
| 2,855,631 | 10/1958 | Rowley | 264/DIG. 60 |
| 2,861,963 | 11/1958 | Butsch | 264/50 X |
| 2,909,493 | 10/1959 | Bush | 264/50 X |
| 2,926,390 | 3/1960 | Talalay et al. | 264/50 X |
| 2,966,469 | 12/1960 | Smythe et al. | 264/26 |
| 3,173,978 | 3/1965 | Olson et al. | 264/DIG. 60 |
| 3,301,798 | 1/1967 | Waterman et al. | 264/50 X |
| 3,345,439 | 10/1967 | Everard et al. | 264/26 |
| 3,639,190 | 2/1972 | Brooke et al. | 264/26 X |
| 3,708,441 | 1/1973 | Joslyn et al. | 264/50 X |
| 4,205,137 | 5/1980 | Akiyama | 521/74 X |

FOREIGN PATENT DOCUMENTS

| | | | |
|---|---|---|---|
| 2944503 | 5/1981 | Fed. Rep. of Germany | 521/74 |
| 54-103132 | 8/1979 | Japan | 15/424 |
| 54-146131 | 11/1979 | Japan | 15/424 |
| 54-155246 | 12/1979 | Japan | 15/424 |
| 56-28255 | 3/1981 | Japan | 15/424 |
| 56-74139 | 6/1981 | Japan | 15/424 |
| 56-120706 | 9/1981 | Japan | 15/424 |

OTHER PUBLICATIONS

Morris, D. C., K. M. Deal and R. R. Waterman, "Vanderbilt Process Vinyl Foam", in the 20th Annual Technical Conference, Technical Papers, vol. X, Atlantic City, N.J., Jan. 27-30, 1964, V-4, pp. 1-3 (SPE).
Whittington's Dictionary of Plastics, by Lloyd R. Whittington, Stamford, Conn., Technomic, ©1968, Preface, pp. 59-60.
The Condensed Chemical Dictionary, Eighth Edition, Revised by Gessner G. Hawley, New York, Van Nostrand Reinhold, ©1971, p. 714.
Hackh's Chemical Dictionary, Fourth Edition, Completely Revised and Edited by Julius Grant, New York, McGraw-Hill, ©1972, pp. 587-588.

Primary Examiner—Philip Anderson
Attorney, Agent, or Firm—Scully, Scott, Murphy & Presser

[57] ABSTRACT

Uniformly porous foamed erasers and process for the production thereof, the process comprising continuously mixing air or other gas into a flowable plasticized mixture and gelling the mixture by introducing the same continuously to a heating mean.

22 Claims, 2 Drawing Figures

FOAMED RUBBER ERASERS AND PROCESS FOR THE PRODUCTION THEREOF

BACKGROUND OF THE INVENTION

The present invention relates to foamed erasers based on polyvinylchloride (PVC) and/or PVC/PVA (polyvinylacetate) mixed polymerizate plastisols or plasticized flowable mixtures, and more particularly to the process for the production of that type of foamed erasers.

Previously known foamed rubber erasers evidence extremely coarse porous and non-uniform structures. As a rule, they are produced in a manner such that the initial charge medium, which is suitable for the respective basic substance desired, deteriorates under elevated temperature with gas being given.

Due to this exothermic, irreversible, deterioration process, the erasing compound produced possesses individual hollow spaces, which cannot be regulated, either in terms of their size or their uniform distribution within the entire compound, in a controllable manner.

Moreover, rubber erasers of this type cannot be continuously produced. In general, previously employed processes involve foaming the latex mixtures, PVC-plastisol or similar flowable materials in continuous foaming agitators with the addition of air or other gas infeed with mixing.

SUMMARY OF THE INVENTION

In utilizing these known mixing or respective foam methods, it is an object of the present invention to provide a foamed eraser having a uniform fine, invariable structure.

Still another object of the invention is to provide a process for the production of such foamed erasers, as well as a process suitable to formulate these foamed erasers having suitable pore structure in continuous operation.

The foregoing objects are achieved herein by a process, wherein foamed erasers based on polyvinylchloride or polyvinylchloride and polyvinlyacetate having uniform pore structure and produced, the process comprising the constant admixture of air or other gas into the flowable basic compound prior to gelling under conditions hereinafter described.

DESCRIPTION OF THE PREFERRED EMBODIMENTS

Figure 1:
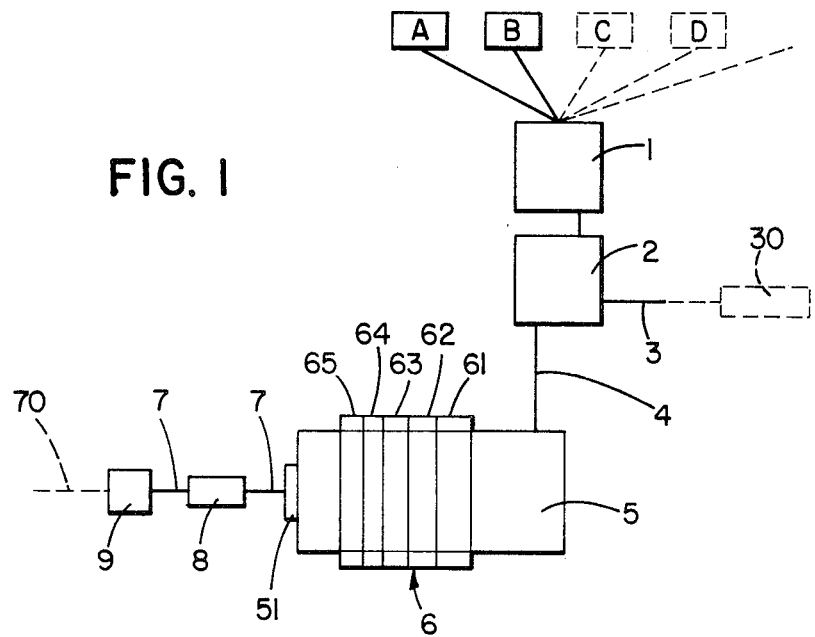
FIGS. 1 and 2 are schematic representations depicting the apparatus employed in the eraser making process of the present invention.

Due to the uniform admixture of air or other gas, which may be produced in situ prior to gelling of the flowable basic compound, the thus obtained eraser is imparted with a particularly fine, porous and uniformly porous structure, the precise nature of which depends upon the air or gas addition, the consistency of the basic compound, as well as the mixing period and the mixing speed, which may vary.

Similarly, in this manner, the final density of the finished products can be suitably adjusted. Values between 0.8 and 1.4 and preferably between 0.9 and 1.3 grams per cubic centimenter are desired.

Through the admixing in of emulsifiers and/or additional solvents, the foam can be stabilized for a lengthy period during the manufacture. These additional solvents will, in addition thereto, be further effective as supplementary, or in an extreme case as execlusive, pore formers and should be volatile between 20° and 120° C.

Pursuant to the present process, foamed erasers having extremely fine, porous, uniformly arranged foamed structure which are particularly light and inexpensive, can be produced in a surprisingly simple manner through the combination of a commercial continuously operating foamer mixer and a particular gelling arrangement or procedure.

The foam mixer coupled with the gelling arrangement conveys the produced foam under pressure directly onto and respectively into a continuously operating conveying unit or extruder. By means of the latter, the foamed compound is conveyed through differentially constructed heating zones, with, for example, temperature stages of 60°, 90°, 120°, 130°, 135° C. As a result, the eraser compound gells under correctly selected heating conditions, respectively on a movable conveyance, with the maintenance of its erasing capacity provided by a maximum temperature which is below the point where the gelled compound becomes completely solidified and can thereafter for example, be cooled in a water bath and then cut into usable suitably large pieces.

When the gelling arrangement consists of heated extruder, then the kind of heating employed is secondary since the movement of the erasing compound within the extruder results a uniform hardening without the formation of crusts or the production of diverse hardening zones. It is important however, that the extruder exhibit differentiated temperature zones which facilitate by way of for example the above mentioned temperature stages and in which the conveying screw of the extruder is uniformly profiled so that the flow of the foam can be protected without backup or increased pressure or fragmentation.

Particularly suited are standard conveying screws with uniform forward movement per rotation (between 2 and 6 mm), uniform pitch (preferably 30°) and uniform passageway width.

In particular, in the utilization of other conveying units, such as conveying belts or the like, it is important that radiation heat generating apparatuses are not utilized as the heating elements. Preferably, high frequency or microwave heating apparatuses are utilized at the heating elements.

Through the herein proposed heating procedure, the gelling of the eraser compound is affected not directly extending inwardly but uniformly within the entire profile of the eraser strand so as to form neither variable zones nor smooth nonerasing edge zones (surfaces).

Figure 2:
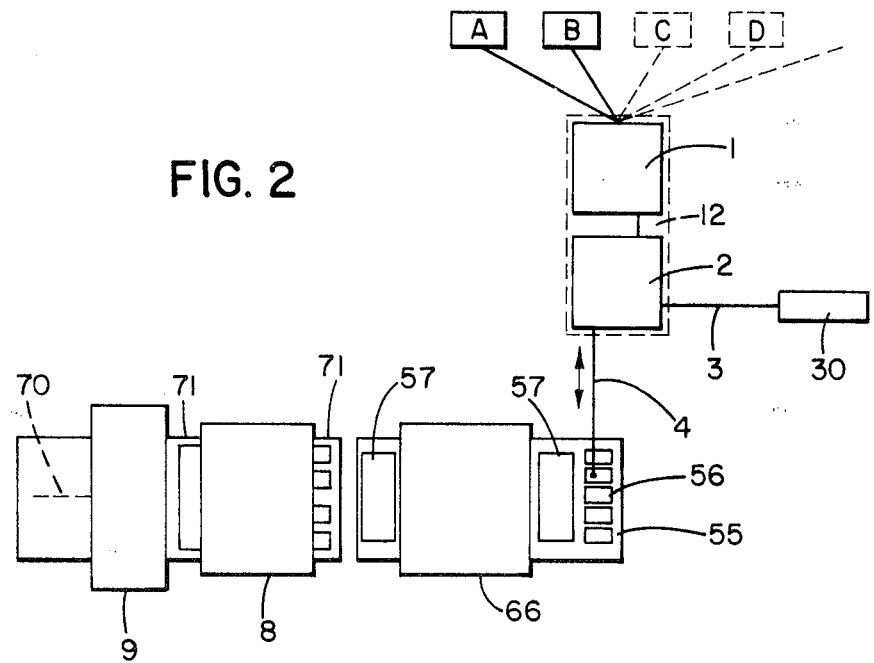

In order to illustrate one specific embodiment of the present invention, reference is made to FIGS. 1 and 2 of the Drawings. Initially, polyvinylchloride or polyvinylchloride and polyvinylacetate (A,B) are supplied to mixer 1. Additional components such as emulsifiers and/or solvents can also be provided (C,D) in the formulation of the plastisol. Air or another acceptable gas is introduced by inlet 3 or compressor 30 provided at the lower end of foam mixer 2 in order to form a uniform, flowable compound prior to gelling. A combination mixer and foam mixer can be employed to facilitate both mixing steps in a single apparatus 12. The foamed admixture leaves the mixing apparatus through conduit 4 and enters extruder or piston press 5 which is provided with nozzle 51 so that the eraser material can be shaped as desired. Alternatively, conduit 4 feeds a conveyor belt 55 which carries the foamed eraser material into profile molds 56 and plate frame 57. Whether the foamed material is shaped through the nozzle (51) of an extruder (5) or by profile molds (56), the foamed plastisol material is subjected to a heating arrangement 6 which permits gelling of the foamed plastisol during or prior to shaping. Moreover, gelling is effected under constant temperature as indicated by the heating zone of 66 or under varying temperatures as shown by heating zones 61–65. The gelled admixed plastisol eraser material in the form of a strand 7 is extruded through nozzle 51 into a cooling arrangement 8 and subsequently through a cutter or puncher 9 where the final shape of the finished product 70 is provided. When a conveyor belt (56) has been employed instead of an extruder (5), conveyor 71 continues out from the heating arrangement into cooling apparatus 8 and then through cutter or puncher 9 to form the final eraser product 70.

In order that those skilled in the art may better understand how the present invention is practiced, the following examples are presented by way of illustration and not by way of limitation.

EXAMPLE 1

25.0 parts polyvinylchloride (K-Value 70)
37.0 parts calcium carbonate (grainsize less than 5 microns)
37.0 parts di-2-ethylhexylpthalate
1.0 part calcium stearate
1.0 part foam stabilizer on base of silicon (Wacker-Chemie GmbH Munich)

These components are admixed to a completely dispersed plastisol and then introduced into the foam mixer.

EXAMPLE 2

28 parts polyvinylchloride (K-Value 70)
35 parts calcium carbonate (grainsize less than 5 microns)
38 parts dibutylpthalate
1 part calcium stearate

EXAMPLE 3

25 parts polyvinychloride (K-Value 70)
35 parts calcium carbonate (grainsize less than 5 microns)
35 parts di-2-ethylhexylphthalate
4 parts isotridecnol-polyglycol ether
1 part aluminum stearate

EXAMPLE 4

31 parts polyvinylchloride (K-Value 70)
30 parts calcium carbonate (grainsize 2–15 microns)
35 parts di-isononyladipate
4 parts alkylbenzene with a linear $C_{10}$–$C_{13}$ alkyl residue
1 part calcium stearate

EXAMPLE 5

43 parts polyvinylchloride (K-Value 70)
50 parts di-2-ethylhexylphthalate
4 parts pyrogeneous silicic acid
2 parts fattyalcohol-ethoxylate
1 part calcium stearate

EXAMPLE 6

25 parts polyvinylchloride (K-Value 70)
36 parts calcium carbonate (grainsize less than 5 microns)
37 parts di-2-ethylhexylphthalate
1 part n-heptane
1 part calcium stearate In addition to the usual basic substances required for the production of the eraser, the formulations partially include on occassion suitable foam stabilizers (e.g. on base of silicone), emulsifiers and/or further solvents for completing foam formation. When adding e.g. such foam stabilizers they are used preferably in amounts of upto 5 percent by weight, based on the polymer. The components are admixed, prior to further processing pursuant to the process of this invention, to a fully dispersed plastisol.

In addition to the ingredients set forth in the above examples, other suitable surface active substances and/or volatile solvents (volatile at 20° to 120° C.) for the achievement and stabilization of particular fine porous foam may also be employed.

In the event it is required or desired, the viscosity of the plastisol can be modified through the utilization of more rapid or slower gelling softening agents, in order to be able to vary the dwell period in the microwave or high frequency field, whereby the erasing ability of the finished product can be adjusted to the desired level.

In the utilization of an extruder as the conveying element, as a rule, the external profile of the eraser is shaped by a nozzle which is connected to the output of the extruder whereas in a conveyor belt the shapes may be predetermined as diverse surface profiles and suitable motifs or structures, in particular, perpendicular to the conveying direction.

The foam mixer, which is utilized herein, should preferably contain coolable stator and rotor mixing elements with oppositely directed spur gear crowns or shearing plates, controllable conveyor pumps at the inlet and outlet of the mixer as well as suitable air and gas inlet measuring arrangements and rotational speed control. During mixing, the air or other gas is "whipped in", by mens of the interengaging gear crowns or plates in the plastisols, so that stiffer physical structure foam is formed, which with further suitable controls is introduced into the extruder under pressure or applied onto a conveyor and then under the differential heating effects herewith described is gelled to the desired rubber erasers.

Foam stabilizing emulsifiers are exemplified hereabove by isotridecanol-polyglycol ether (Example 3), alkylbenzene (Example 4) and fattyalcohol-ethoxylate (Example 5), while n-heptane in Example 6 represents a foam building intensifying solvent. Example 2 do not evidence any further additives.

Obviously, other modifications and variations of the present invention are possible in the light of the above teachings.

For example, practically any plasticized eraser forming mixture, with or without abrasive fillers or other suitable additives, can be utilized in the herein proposed process for the production of the foamed.

It is to be understood, therefore, that changes may be made in the particular embodiments of the invention which are within the full intended scope of the invention as defined by the appended claims.

What is claimed and desired to be secured by Letters Patent is:

1. A proces for producing a shaped foamed eraser material having a uniformly porous structure with a gas uniformly distributed therein, the steps consisting essentially of:
   (a) forming a dispersed plastisol of polyvinly chloride or polyvinylchloride/polyvinylacetate;
   (b) foaming said plastisol in a foamer mixer by introducing gas into the plastisol during said foaming to obtain a uniform distribution of gas throughout the gas admixted plastisol;
   (c) shaping the gas admixted plastisol;
   (d) gelling the shaped gas admixed plastisol to form a shaped foamed eraser material by subjecting the gas admixed plastisol to at least one heating zone where the maximum temperature is below the temperature whereby the gelled admixture becomes completely solidified.

2. A process for producing a shaped foamed eraser material as claimed in claim 1, wherein said step of subjecting the gas admixing plastisol to at least one heating zone including the step of subjecting the gas admixed plastisol to a plurality of sequentially arranged heating zones at progressively higher temperatures.

3. A process for producing a shaped foamed eraser material as claimed in claim 2, wherein said step of forming a dispersed plasticized mixture includes the step of adding emulsifiers or additional solvents or mixtures thereof to the dispersed plasticized mixture.

4. A process for producing a shaped foamed eraser material as claimed in claim 1 or 2, wherein said step of forming a dispersed plasticized mixture includes the step of adding foam stabilizers on base of silicone in amounts of up to five percent by weight.

5. A process for producing a shaped foamed eraser material as claimed in claim 2 or 1, wherein said gas admixed plastisol is subjected to the heating zone in a continuously operated extruder.

6. A process for producing a shaped foamed eraser material as claimed in claim 2 or 1, wherein said eraser material is shaped by extrusion or molding and then cooled and subsequently cut or punched into a final eraser product.

7. A process for producing a shaped foamed eraser material as claimed in claim 1 or 2, wherein each heating zone comprises a high frequency, microwave heating source.

8. A process for producing a shaped foamed eraser material as claimed in claim 6, wherein the final shaped foamed eraser material produced has a density of from 0.8 to 1.4 grams per cubic centimeter.

9. A process for producing a shaped foamed eraser material as claimed in claim 2 wherein the sequentially arranged heating zones progressively provide temperatures of about 60° C., 90° C., 120° C., 130° C. and 135° C., respectively.

10. The process of claim 1 or 2 wherein said shaped gas admixed plastisol is subjected to the heating zone by a continuously operated conveyor belt.

11. The process of claim 1 wherein the plastisol dispersion contains additives selected from the group consisting of softeners, fillers, emulsifiers, stabilizers, solvents and rubbers.

12. A foamed eraser containing finely divided gas and having a uniformly porous structure produced by the process of claim 6.

13. A foamed eraser containing finely divided gas and having a uniformly porous structure produced by the process of claim 6.

14. A foamed eraser containing finely divided gas and having a uniformly porous structure produced by the process of claim 6.

15. A foamed eraser containing finely divided gas and having a uniformly porous structure produced by the process of claim 6.

16. A foamed eraser containing finely divided gas and having a uniformly porous structure produced by the process of claim 6.

17. A foamed eraser containing finely divided gas and having a uniformly porous structure produced by the process of claim 6.

18. A foamed eraser containing finely divided gas and having a uniformly porous structure produced by the process of claim 6.

19. A foamed eraser containing finely divided gas and having a uniformly porous structure produced by the process of claim 6.

20. A foamed eraser containing finely divided gas and having a uniformly porous structure produced by the process of claim 6.

21. A foamed eraser containing finely divided gas and having a uniformly porous structure produced by the process of claim 6.

22. A foamed eraser containing finely divided gas and having a uniformly porous structure produced by the process of claim 8.

* * * * *